United States Patent [19]

Messer et al.

[11] Patent Number: 5,716,894
[45] Date of Patent: Feb. 10, 1998

[54] WHITEWARE CERAMIC COMPOSITIONS

[75] Inventors: Peter Francis Messer; Ahmet Capoglu; Majid Jafari; Ahmad Fauzi Mohd Noor; Henry Ehibhanre Okojie, all of Sheffield, England

[73] Assignee: British Technology Group Limited, London, England

[21] Appl. No.: 617,901

[22] PCT Filed: Sep. 9, 1994

[86] PCT No.: PCT/GB94/01963

§ 371 Date: Mar. 28, 1996

§ 102(e) Date: Mar. 28, 1996

[87] PCT Pub. No.: WO95/07867

PCT Pub. Date: Mar. 23, 1995

[30] Foreign Application Priority Data

Sep. 16, 1993 [GB] United Kingdom ............... 9319152

[51] Int. Cl.$^6$ ............... C04B 33/04; C04B 33/24
[52] U.S. Cl. ............... 501/141; 501/142; 501/143; 501/144; 501/119; 501/122; 501/128; 501/150; 428/689; 428/697
[58] Field of Search ............... 501/141, 142, 501/143, 144, 150, 128, 119, 122, 118; 106/486; 428/689, 697

[56] References Cited

U.S. PATENT DOCUMENTS

| 2,898,217 | 8/1959 | Selsing | 501/144 |
| 5,143,871 | 9/1992 | Leese et al. | 501/150 |
| 5,455,210 | 10/1995 | Kreiner | 501/141 |
| 5,461,015 | 10/1995 | Kinsman et al. | 501/143 |

FOREIGN PATENT DOCUMENTS

| 0 360 547 | 3/1990 | European Pat. Off. . |
| 23 31 263 | 1/1975 | Germany . |

OTHER PUBLICATIONS

Database WPI Week 8459,Derwent Publications Ltd., London, GB, AN 84–311604, & SU A, 1 090 678, 7 May 1984, Abstract.

Chemical Abstracts #155329z, vol. 95 No. 18, 2 Nov. 1981, Columbus, Ohio, US. "Manufacture of Porecelain Products", p. 297.

Chemical Abstracts #160285c, vol. 107, No. 18, 2 Nov. 1987, Columbus, Ohio, US, p. 385.

*Primary Examiner*—Michael Marcheschi
*Attorney, Agent, or Firm*—Nixon & Vanderhye

[57] ABSTRACT

A whiteware ceramic composition is provided comprising a filler, 4 to 10% by weight of a flux having a median particle size of below 6 microns, a prefired ceramic material milled separately from the other components, and raw clay constituting from 5 to 20% by weight of the composition. Fired whiteware made by firing the composition of the invention is also disclosed.

38 Claims, No Drawings

WHITEWARE CERAMIC COMPOSITIONS

This application is a 371 of an International Application of PCT/GB94/01963, filed Sep. 9, 1994.

This invention relates to whiteware ceramic compositions, especially those which may be amenable to pressing, slip casting or injection moulding. The whiteware compositions of this invention comprise glasses and many of the same crystalline phases as conventional whiteware compositions, although the proportions of the phases, the compositions of the glassy phases or other aspects will differ. The whitewares covered by this invention include electrical porcelain, sanitaryware and tableware, including bone china and hotelware, but exclude e.g. steatites, aluminas and whitewares used for wall tiles. One whiteware made possible by the invention, a fine translucent whiteware based on anorthite, has no conventional equivalent, being composed mainly of anorthite, a major crystalline component of bone china, glass and small amounts of other crystalline phases such as mullite and possibly some composed of calcia-magnesia-silica. It contains reduced (preferably no) β-tricalcium phosphate, the other major crystalline component of bone china, and so has a much lower coefficient of thermal expansion and an improved thermal shock resistance.

Conventional compositions ("body mixtures") apart from bone china comprise roughly: 1 part by weight of a filler, such as 10 μm quartz, cristobalite, or a mixture of alumina and quartz; 1 part of flux, such as 10 μm feldspar or nepheline syenite; and 2 parts of fines, such as china clay and/or ball clay, which are both mainly kaolinitic platey particles at least an order of magnitude smaller than the filler. (Sizes throughout the specification are median sizes, are somewhat approximate, and are taken as equivalent spherical diameter (e.s.d.) as measured by laser diffraction. Amounts throughout are by weight). The raw clay content of conventional whitewares of the types listed above, ranges from about 25% to greater than about 60%. In some compositions, small quantities of coarsely ground prefired clay ("chamotte") or coarsely ground whiteware body ("pitchers") are added to reduce shrinkage. These are often termed grogs. The e.s.d. of this component may be up to 1 mm. A bone china composition might comprise 50% by weight of 5 μm calcined bone (hydrated calcium phosphate), 20% of 10 μm Cornish stone flux and 30% micron-to-submicron china clay. These compositions give rise to a reject rate which ought to be taken seriously, many of the faults such as a centre pip or mould lines being attributable to unwanted alignment of the platey clay particles.

However, the clays are present for good reason. They confer plasticity for forming, binding properties giving strength in the unfired state (green strength) and a high specific surface area to drive densification during firing. China clays and ball clays are indeed usually mixed to obtain the required properties. Ball clay particles are much finer, consequently increasing the ball clay content in the mixture improves the plasticity and increases both the green strength and driving force for densification. However, impurities such as iron and titanium which cause unwanted colouration in the fired product are higher in ball clay than in china clay. Occasionally, halloysite is employed as the clay, because it combines a low impurity content with a very fine particle size. Halloysite particles are tubular in shape.

Returning to consider the other components, flux produces a viscous liquid when its alkali oxides interact mainly with the clay and to some extent with siliceous fillers during firing. (Quartz and cristobalite fillers tend to dissolve in liquid flux). Densification occurs through a liquid-phase sintering process, in which viscous flow is the dominant mechanism.

Filler, so called even though it is not usually inert, acts as an antidistortion component by reducing the plasticity of the body in the unfired, wet state and during firing. Quartz and cristobalite when used as fillers also play an important role in increasing the thermal contraction of whitewares on cooling after firing, so that glazes are put into compression and crazing is avoided.

The flux and filler particles are coarser than those of the clays. This allows the body mixture to pack efficiently and so keep the firing shrinkage low. In commercial practice, quartz and the fluxes have median particle sizes which are about 10 μm.

As the particles of the china and ball clays are platey, they become aligned during plastic forming, slip casting and spray drying. This alignment causes plastically-formed and slip-cast wares to shrink anisotropically during firing with resultant unwanted changes in their shapes and the development of stresses. Distortion caused by anisotropic shrinkage results in production losses and reduced product quality. These shrinkage stresses can be relieved at firing temperature by the formation of fissures, which may become the flaws from which fracture is initiated in service. The alignment of clay particles in spray dried granules leads to the formation of enlarged pores during firing powder-pressed wares. Enlarged pores form at the centres of most compacted granules and these reduce the fracture toughness of the wares.

At the firing temperature, mainly as a result of the clay-flux interaction, large proportions of all whiteware bodies become viscous silicate liquids. As a consequence, wares can deform and distort under their own weights, as well as from stresses arising became of anisotropic shrinkage as discussed in the previous paragraph. Such distortions during firing are commonly called pyroplastic deformation. Fine translucent china, bone china and alumina-containing wares are especially prone to this pyroplastic deformation, which leads to high production losses. Plates, bowls and saucers of fine and bone chinas have to be fired in refractory supports to retain their shapes. Other items also require to be supported throughout firing for shape retention. Thus, the firing stage is inefficient, as so much space in the kiln is occupied by the supports. Pyroplastic deformation prevents the use of a single firing process to obtain glazed wares.

The large contractions of quartz and cristobalite grains on cooling from the firing temperature, arising from a combination of thermal contractions and reductions in volume associated with their β–α phase changes, are an advantage in preventing crazing of glazes but can cause the grains to become detached from the surrounding matrices. Some grains that do not become detached on cooling may do so when the material is subsequently loaded mechanically. The probability that a grain will become detached on cooling or loading increases as its size increases. With the size distribution for quartz employed commercially, a significant proportion of the quartz grains break away on cooling. Detached grains cannot transmit mechanical loads and hence their presence reduces the fracture toughness.

It would therefore be desirable to formulate whitewares such as electrical porcelains, sanitarywares, vitrified hotelwares, alumina-containing whitewares, fine translucent chinas, hard porcelains and bone chinas in a way that gives rise to significantly less anisotropic shrinkage and pyroplastic deformation, with consequently fewer rejects, and such that whitewares with higher toughnesses and strengths are obtained. Ideally, the formulation should allow translucent free china and bone china tableware and other wares to be given their heat treatments without being supported. Thus, their glazes could be fired on at higher temperatures than used conventionally, with consequent improvement in glaze durability and hardness and avoiding the need to use lead-containing glaze. For whitewares that are translucent, where whiteness is at a premium, e.g. bone china, free china, anorthite-based whiteware and hard porcelain, the total clay content in the formulation, which to a large extent determines the iron oxide (=colour) content, should be reduced to improve whiteness, its part in effect being taken by reactive or hydrated alumina and quartz.

Whiteware ceramic compositions according to the present invention comprise filler and flux and a prefired ceramic material milled separately from the other components, wherein the raw clay content of the compositions is from 5 to 20% by weight. For opaque whitewares, such as electrical porcelains, sanitarywares, vitrified hotelwares, vitrified replacements for earthenwares, and alumina-containing wares, the raw clay content is preferably in the range 10–15%. The raw clay would preferably be ball clay or a mixture of ball clay and china clay. For wares such as free translucent chinas and hard porcelains the raw clay component is preferably in the range 5 to 15%. It should be of low iron oxide content, e.g. a high quality china clay, halloysite, a mixture of these or either or both of these clays mixed with some ball clay. For bone chinas and anorthite-based whitewares, a clay or mixture of clays of similar low iron oxide content is used in the range 5 or 8 to 12%. The use of low raw clay content significantly diminishes the anisotropy of shrinkage which arises from clay particle alignment. According to the invention, the batch of constituents for any of the listed whitewares can have a broad particle size range, with coarser material being present than is sometimes used conventionally. Thus, the composition may contain constituents whose median particle size is less than 1 micron, those whose median particle size is from 1 to 6, 1 to 12 or 1 to 20 microns and those whose median particle size exceeds 6–10, 12 or 20 microns, respectively. The batch may have a high packing efficiency, e.g. it may be such as to have a shrinkage on firing of 10% (linear) or less.

The compositions contain a prefired milled material, preferably making up 30–90% of the composition, milled for example to a median particle size of from 10 to 50, e.g. 10 to 20 or 30 μm (especially where the composition also comprises cristobalite) or from 15 to 30 or 40 microns (especially where the composition also comprises quartz) or, for bone china, anorthite-based whiteware and hard porcelain especially, from 10 to 20 microns e.g. 10 to 15 microns, thus constituting a coarse size fraction, preferably excluding particles exceeding 80 μm (more preferably excluding those exceeding 60 μm most preferably excluding those exceeding 50 μm) achieved e.g. by sieving and preferably substantially equiaxed, and preferably having a porosity not exceeding 7%, preferably not exceeding 5%. The composition may further comprise the same or a different prefired material milled to a median particle size of one-fifth to one-tenth that of the prefired milled material mentioned in the previous sentence, e.g. 1 to 20 microns. The or each prefired material should be appropriate to the type of whiteware of which it forms a part, for example, a translucent prefired material to make a translucent whiteware. To reduce the tendency of whitewares to deform under their own weights upon firing, the prefired material(s) should be formulated so that they are stiff at the firing temperature of the whitewares, e.g. by the or each prefired material having a lower flux content than the overall average value for the whiteware of which it is a constituent Thus, preferably, the prefired material even if other than of solely clay is more deformation-resistant at the firing temperature of the composition than the composition as a whole. Whilst in a final body aluminum cannot be present as $Al(OH)_3$ or other hydrated alumina, because the evolved water would cause pores and fissures, this consideration does not apply with such force (i.e. $Al(OH)_3$ may be used) in making prefired material, which is to be milled anyway. It may be used with silica (e.g. quartz) for maximum whiteness. Thus, the invention envisages the use of a combination of aluminum trihydroxide (£300/t) or other hydrated or reactive alumina plus silica (e.g. quartz £180/t) as a (synthetic) replacement for clay (£400/t) to reduce the iron oxide content, especially in the prefired body. In addition to the whiteware compositions according to the invention containing a substantial proportion of prefired material, they contain lower raw clay contents than usual, and these features act together to reduce distortion of the whiteware caused by firing. The proportion of prefired material may in some cases be 30 to 65%, or in other cases 60 to 90%, and 30–65% may be of one size cut. A size cut is all those particles none of which exceeds five times the size of any other such particle. Where the prefired material is translucent, 55–65% of the composition may be of one size cut of the prefired material. Otherwise 30–50% of the composition may be of prefired material, if made from solely clay (up to 65% if made from clay with filler).

The filler and flux particles in conventionally formulated whitewares (at ~10 μm) are the coarser components, the reverse of the preferred situation according to the invention, wherein prefired materials (at 10–50 μm) are the coarser components. Consequently, the filler and flux sizes can be optimised for the particular body mixture, and packing efficiency can then be ensured by appropriate sizing of the prefired materials. Thus according to the invention, relatively fine fluxes and fillers can be used without increasing the firing shrinkages.

The use of fluxes of median particle size below 6, preferably below 2 microns, which is substantially finer fluxes than conventional, results in lower residual porosities in the fired whitewares, because such fine particles give rise to correspondingly fine shrinkage holes which are small enough to sinter out, increasing the density. When quartz or cristobalite are used as the fillers, it has now been found that the finer particle sizes (e.g. from 8 microns downwards to 1 micron) lead to less of these fillers becoming detached from the matrices after cooling from the firing temperatures, than if larger particles had been used. Both the lower porosities from the finer fluxes and increased tendency for the quartz and cristobalite grains to remain bonded lead to increased toughnesses and strengths, which is always useful but of especial relevance to opaque products (i.e. not so much to the more translucent tablewares). The reduction in the anisotropy of the firing shrinkages from the use of lower raw clay contents leads to lower porosities in wares made by powder-pressing spray-dried granulates, which leads to increased toughnesses and strengths. The tendency of the wares to form fissures that can act as fracture-initiating flaws, to relieve stresses caused by anisotropic firing shrinkage, is also reduced when lower raw clay contents are used. Consequently, the use of finer fluxes, finer quartz and cristobalite, when present, and reduced clay contents all act together to increase toughness and strength values. Quartz and cristobalite filler particles should however not be so small as to dissolve completely in the viscous liquid, and this imposes a lower particle size limit of preferably 1 μm more preferably 3 μm.

The use of a broader particle size range, i.e. coarse, medium and fine particles, allows a smaller proportion of fine material to be incorporated for a given packing efficiency. The fine particles, i.e. particles less than 1 µm (actual ESD), similar to the conventional, depending on the type of whiteware, may include ball clay, halloysite and proportions of each of china clay, the fluxes and fillers. The fines may also include a (preferably large) proportion of any particulate mineralisers (auxiliary fluxes) when these are added to aid densification and the fines may further include reactive aluminas of very low iron content, added to some batches to effect a reduction of the raw clay content (hence also iron content) used in the final body.

Turning to the coarse particles, the prefired material, at 10–50 µm being generally coarser than the conventional except where ultra-coarse grogs are used, is preferably made from clay;

clay and/or aluminum trihydroxide or other hydrated or reactive alumina (e.g. γ-alumina) with silica (e.g. quartz) to react with the hydrated or reactive alumina+filler+flux;

beneficiated micaceous waste+filler+optionally clay;

calcium carbonate (e.g. chalk) or other suitable calcium-containing compound (e.g. calcium hydroxide)+magnesium carbonate or other suitable magnesium-containing compound (e.g. magnesium hydroxide)+aluminum trihydroxide or other hydrated or reactive alumina+silica (e.g. quartz) and optionally clay; or bone ash or other suitable compound containing phosphorus (e.g. tricalcium phosphate $Ca(PO_4)_3$)+aluminum trihydroxide or other hydrated or reactive alumina+silica (e.g. quartz)+calcium carbonate (e.g. chalk) or other suitable calcium-containing compound (e.g. calcium hydroxide)+optionally flux (e.g. nepheline syenite)+optionally clay. The beneficiation of the micaceous waste may be magnetic, thus removing (magnetic) biotite (which contains iron and is therefore coloured), leaving a higher proportion of relatively colourless muscovite. The incorporation of quartz or alternative material as the filler (e.g. alumina, cristobalite or a mixture thereof) into the prefired material yields a higher proportion of crystalline phase in the overall body than when clay is used as the prefired component and helps to minimise the glass content, making the material tougher.

An economic prefired material for opaque whitewares is calcined clay. For these, an acceptable white colour can be obtained with a prefired clay having an iron oxide ($Fe_2O_3$) content of up to about 1%. Such a prefired material can be made by calcining china clays and some ball clays or a mixture of these. Prefired materials for opaque whitewares having a higher crystalline content can be prepared from mixtures of clay, flux and filler or from beneficiated micaceous waste, filler and optionally some clay. This would be done to increase the toughness and strength values of the fired whitewares. The clays used to make the prefired material could be china or ball clays or mixtures of these. The raw clay component in the final opaque whiteware can be either china clay, ball clay or a mixture of these; the flux for the prefired and final material can be Cornish stone, a feldspar or nepheline syenite; and the filler for the prefired and final whiteware can be quartz, cristobalite, α-alumina, wollastonite or bone or a mixture of any of these, of preferred median particle size 1 to 8 microns (for bone, 1 to 2 microns or less).

The most suitable prefired materials for the coarse components for the translucent whitewares, i.e. fine translucent chinas, hard porcelains, anorthite porcelains and bone chinas, are all different. The most suitable prefired material for fine translucent china i.e. whiteware containing quartz is translucent and is made mainly of quartz+feldspar (preferably a potash feldspar to avoid cristobalite formation) +some clay and/or aluminium trihydroxide or a reactive alumina or mixtures of any of these, where the clay component has a low iron oxide content and the aluminum trihydroxide and reactive alumina have very low iron oxide contents. The total $Fe_2O_3$ from all sources should be kept below 0.2 wt %. Titanium is also considered an equally undesirable source of colour, and ball clay typically contains 1% of each. A suitable composition is thus 85% prefired material, 7½% ball clay and 7½% china clay.

The most suitable prefired material for hard porcelain is made from the same constituents as used for fine translucent quartz-containing whiteware but the preferred proportions of the constituents are different, so that the resulting fired material has a lower thermal expansion coefficient than that of fired material destined for fine translucent china; the preferred proportions for porcelain are such as to avoid residual quartz.

The prefired material for anorthite-based whiteware is used as the coarse and medium-sized components. These materials may also be used in the bone china formulation. The most suitable prefired material for anorthite-based whiteware should have a very low iron oxide content as whiteness is at a premium. This can be achieved as indicated earlier by using a combination of aluminum trihydroxide or other hydrated alumina or reactive alumina having a very low iron oxide content plus silica (e.g. quartz) of low iron oxide content as a replacement for clay. That is, preferably no clay or only a small proportion of clay should be used to make the prefired material. The calcium to form anorthite ($CaO.Al_2O_3.2SiO_2$) with the previously mentioned constituents can be calcium carbonate (e.g. chalk) or other suitable calcium-containing compound of low iron oxide content (e.g. calcium hydroxide). The prefired material may be sintered with a liquid phase which comes from the reaction between anorthite and calcia-magnesia-silica compounds (e.g. diopside). The magnesia for the reaction can be provided by magnesium carbonate or other suitable magnesium-containing compound (e.g. magnesium hydroxide) having a low iron oxide content. Alternatively the prefired material may be sintered with a liquid phase derived from the reaction of bone ash with excess silica over that required to form anorthite.

The most suitable coarse prefired material for translucent bone china should, like all its other constituents, have a low iron oxide content as whiteness is at a premium. For such a prefired material, the phosphate required to form β-tricalcium phosphate crystals can be provided in the traditional way by using calcined and milled bone or synthesised hydroxyapatite or by adding chemically-derived calcium phosphate, phosphoric acid or phosphorus pentoxide. The other components are the flux+clay or aluminum trihydroxide or reactive alumina or a mixture of any of these+finely-milled silica (e.g. quartz) and calcium carbonate (e.g. chalk) as required to bring about the formation of anorthite in preference to phases such as α-alumina and mullite. The clay should be a high quality china clay or halloysite or a mixture of these and the aluminum trihydroxide and reactive alumina may be from the Bayer process.

The coarsest coarse prefired material would be used when quartz and/or α-alumina is present as filler in the final whiteware. The quartz particles when present should be significantly smaller than the prefired particles to achieve efficient space filling, while being neither so small as to dissolve completely in the viscous liquid, nor so large as to detach themselves from the surrounding material as they contract upon cooling. The median sizes of the coarsely-milled prefired materials are chosen so that particle packing of the final unfired whitewares is as efficient as possible taking into account the sizes of the other constituents. Whitewares made with alumina as the filler would have a minimum median size for the prefired material, chosen on the basis of particle packing, in the range 20 to 25 μm. For bone china, anorthite-based whiteware and hard porcelain as already mentioned, the minimum median size could be finer and be in the range 10 to 15 mm. The use of finer median sizes than needed for the most efficient packing, simply increases fling shrinkage. The amount of shrinkage that occurs during firing is however not as critical for compositions according to the invention because the shrinkage is more nearly isotropic.

The raw clay (fines) is preferably in the size range 5 to 10 times smaller (linear) than the filler, and may comprise china clay (typical particle size 2.0 μm×0.2 μm) or ball clay (0.2 μm×0.02 μm) or halloysite. The fines will usually be mainly a single clay or a mixture of clays, but should include the bulk of such mineraliser as is present if used in particulate form. The clay minerals that can be used depend on the properties required of the final fired whiteware, but can be any clay or clay mixture that is sufficiently pure to yield a ware of acceptable colour.

The filler is preferably in the size range of 5 to 10 times smaller (linear) than the prefired material, e.g. 5 μm, and preferably the filler and flux taken together have a median size in the range of 5 to 10 times larger (linear) than the raw clay. The flux is preferably of median particle size below 6 μm, preferably below 3 μm, for example of size 1½ μm or of median size 2½ μm preferably smaller than the filler.

The filler (whether for making the prefired material or as used in the final body) may comprise one or more of quartz, cristobalite, alumina (e.g. α-alumina), wollastonite or bone. Where alumina replaces part or all of the quartz in the filler, the composition becomes suitable for chip-resistant hotelware and high-strength electrical porcelain. In addition, further prefired material in an amount of up to 35%, e.g. 20–25% may be present in a size fraction more typical of the filler, e.g. 0.2–0.1 times the size of the previously mentioned coarse prefired material thus e.g. 2–3 μm and optionally of a different composition.

Pyroplastic deformation is reduced by incorporating as much deformation-resistant prefired material as possible consistent with being able to densify the final whiteware and obtaining a final product of sufficient strength. For opaque whitewares made with calcined clay as the coarse component, the amount used will typically be less than when employing prefired materials containing fillers. This is so that the desired proportions of fillers can be incorporated into the final whitewares. The maximum particle sizes for the coarse size fractions are limited by the requirement to prevent sedimentation when the batch is in slip form, i.e. when the constituents of the final whiteware are in suspension in water for the purposes of mixing, spray drying and slip casting. Sedimentation is inhibited by arranging that the slip is partially deflocculated in addition to limiting the size of the coarser particles.

It is advantageous in the preparation of any prefired material, particularly if translucent, to give a calcination heat treatment which causes some bloating, i.e. enlargement of the larger pores whilst the finer pores continue to shrink.

These larger pores can be eliminated during the milling stage to achieve a low final porosity in the milled prefired material.

The flux used in compositions according to the invention may comprise a feldspathic material such as a feldspar e.g. soda and potash feldspars and mixed soda/potash feldspars, or nepheline syenite. Mineralisers or auxiliary fluxes may also be used, such as alkaline-earth containing compounds. The flux particles, whether used to make prefired materials or the final whitewares, should be milled to as free a median e.s.d. size as is practicable, regarded as 2–1 μm, such as 1½ μm. It is believed that diffusion of the fluxing ions, e.g. potassium ions, and the associated oxygen ions occurs from the flux particles into the surrounding material to form viscous liquid. Densification ensues with the material adjacent to each flux particle moving towards the flux particle. Enlarged pores consequently form in the regions between the flux particles and develop to sizes dependent on the flux particle spacing, i.e. larger pores develop with larger spacings. The finer the flux particle size, the smaller is the spacing for a given flux content, until many of the pores arising from the non-uniform shrinkage described above are small enough to be removed by the sintering process. Reducing the median size of the flux particles therefore results in lower residual porosities and a reduction in the severity of the heat treatments to achieve maximum bulk densities. The alkali content required to prevent conversion of quartz to cristobalite, which conversion results in deleterious microcracking, is supplied by the flux and can be reduced by using finer flux particles. This leads to a more uniform distribution of the fluxing ions, reducing localised excesses and deficiencies. This more efficient use of flux is valuable because the overall flux content should be kept as low as possible to minimise pyroplastic deformation. The amounts required depend not only on the prefired material or final whiteware being made but also on the content of alkali oxides in the flux and whether a mineraliser or auxiliary flux is present. For example, as a result of using higher temperatures to make the prefired body and using more finely milled flux, bone china may be prepared with about one-half of the flux used conventionally, such as about 4–10 e.g. 7% nepheline syenite compared with about 14% conventionally.

The prefired materials can be milled to a finer size than for the coarse size fraction and be used as a filler or as part of a mixture of fillers. The amounts of fillers used depend on the type of prefired material or final whiteware being made and are limited by the amounts of the other constituents required in these materials. In addition, for quartz and cristobalite (which undergo a sizeable contraction on cooling) the maximum amounts used may be limited by the necessity to avoid cracking the ware on cooling. As stated earlier, fillers are not generally inert. Quartz and cristobalite are progressively converted into viscous liquid by alkali oxides diffusing into them. Bone converts to β-tricalcium phosphate and some of the surplus calcium oxide temporarily acts as a flux, forming anorthite later.

The median sizes of quartz and cristobalite particles used to make prefired materials can be coarser than those used in the final whitewares as the efficiency of particle packing is of no consequence in the former whereas it is important in the latter. Prefired materials are also usually given more severe heat treatments than those of the final whitewares in which they are incorporated, and of course they also undergo these heat treatments as well. Consequently, as quartz and cristobalite dissolve, coarser particles of these materials could be used when making the prefired materials to offset the greater dissolution. The large contraction which quartz undergoes on cooling requires its particles to be smaller than those used conventionally to maximise the number of quartz grains that remain bonded. For cristobalite, the median size should be smaller still to maximise the number of grains that remain fully attached to the matrix. The median size for quartz should be in the range 3 to 8 μm, preferably 5 to 6 μm, whereas that for cristobalite should be 2 to 5 μm, preferably 2 to 3 μm. The median size for α-alumina is selected on the bases of particle packing and cost. A median size in the range 3 to 8 μm is appropriate. The same range can be used for wollastonite. The median size of bone particles used conventionally is about 3 to 5 μm. A similar size, or 1–2 or 1–3 microns, is suitable for the reformulated bone china.

Body stains may be incorporated in the prefired materials and the final whitewares as required.

Diminution of the clay in the formulations may mean that the whitewares require additions of polymeric plasticisers to be formable. The current commercially employed plastic forming techniques ('plastic' is relatively stiff body) might then not be applicable. However, the tableware industry is changing rapidly to powder pressing where possible, as this is less labour intensive. The new bodies will be suitable for this technique with small additions of binders. It is envisaged, however, that injection moulding can be introduced as a forming technique for objects currently made plastically, or in some cases by slip casting, which cannot be formed by powder pressing. The remainder could be made, as at present, using slip casting or pressure casting.

Injection moulding as currently practised, with waxes or thermoplastic polymer additions to the powdered ceramic, is not ideal for whiteware manufacture, because of the extremely long and costly binder burn-out times and the cost of the polymer binder. Using water and a water-soluble polymer as the binder with compositions according to the invention is quite suitable for whitewares which do not require to meet the close tolerances required for engineering ceramics.

The use of fine fluxes, cristobalite or quartz in conventional whiteware formulations, although improving fracture toughness, leads to poor particle packing and consequent increased shrinkage during drying and firing. With bodies containing a high percentage of clay, the poor packing exacerbates the non-uniform shrinkage problem.

The invention will now be described by way of example.

EXAMPLE 1

Whiteware with Quartz as the Filler

Replacement for electrical porcelain, vitrified hotelware and a vitrified replacement for earthenware. Also suitable for sanitaryware for which the flux may be changed to a soda or mixed soda/potash feldspar.

| Component | Amount | Approximate Median Particle Size |
|---|---|---|
| Prefired China Clay* | 40% | 25 μm |
| Quartz | 30% | 5 μm |
| Potash feldspar | 15% | 2 μm |
| Ball clay | 15% | submicron |

*Commercial material fired at 1500–1550° C., of low (i.e. <7% or even <5%) porosity.

The whiteware was made by firing at 1260°–1280° C. for 3 hours.

EXAMPLE 2

Whiteware with Alumina and Quartz as the Filler

Replacement for high-strength electrical porcelain and high-strength tableware. 'Half-way house' between Examples 1 and 3.

| Component | Amount | Approximate Median Particle Size |
|---|---|---|
| Prefired china clay | 40% | 25 μm |
| α-alumina | 15% | 5 to 6 μm |
| Quartz | 15% | 5 μm |
| Potash feldspar | 15% | 2 μm |
| Ball clay | 15% | submicron |

EXAMPLE 3

Whiteware with Alumina as the Filler

Replacement for high-strength electrical porcelain and high-strength tableware

| Component | Amount | Approximate Median Particle Size |
|---|---|---|
| Prefired china clay | 40% | 25 μm |
| α-alumina | 30% | 5 to 6 μm |
| Potash feldspar | 15% | 2 μm |
| Ball clay | 15% | submicron |

The whiteware was made by firing at 1300° C. for 3 hours.

EXAMPLE 4

Bone Chinas

Prefired Material A Made with a Low-Iron Content Clay

| Component | Amount | Approximate Median Particle Size |
|---|---|---|
| Bone ash | 37½% | 2 μm |
| *China clay or halloysite with low-iron content | 27½% | micron-submicron |
| Calcium carbonate (e.g. chalk) | 8½% | 2 μm |
| aluminum trihydroxide | 13% | 2 μm |
| Silica (e.g. quartz) | 10½% | 2 μm |
| Nepheline syenite | 3% | 2 μm |

This material is prefired at 1320–1340° C. for up to 3 hours.

*The clay component can be increased or decreased with appropriate adjustments to the amounts of aluminum trihydroxide, quartz and bone ash employed.

Prefired Material B Made without Clay

| Component | Amount | Approximate Median Particle Size |
|---|---|---|
| Bone ash | 34% | 2 μm |
| aluminum trihydroxide | 34% | 2 μm |
| Silica (e.g. quartz) | 23% | 2 μm |
| Calcium carbonate (e.g. chalk) | 9% | 2 μm |

This material is prefired at 1320°–1340° C. for up to 3 hours. Note that a range of compositions between A and B can be made.

Prefired Material C Made with a High Content of Bone Ash

| Component | Amount | Approximate Median Particle Size |
|---|---|---|
| Bone Ash | 60% | 2 μm |
| China clay or halloysite with low iron content | 12% | micron-submicron |
| aluminum trihydroxide | 12% | 2 μm |
| Silica (e.g. quartz) | 10% | 2 μm |
| Calcium carbonate (e.g. chalk) | 2% | 2 μm |
| Nepheline syenite | 4% | 2 μm |

This material is prefired at 1320°–1340° C. for 3 hours.

Final Bodies I and II Made with Clay

| Component | Amount | Approximate Median Particle Size |
|---|---|---|
| Prefired Bodies A or B | 60% | 15 μm |
| Bone Ash | 24% | 2 μm |
| Nepheline syenite | 6% | 2 μm |
| *Clay | 10% | micron-submicron |

*Prefired Material A is used for Final Body I for which the raw clay component is a china clay or halloysite which contains as little iron oxide as possible (typically less than or equal to approximatley 0.4% $Fe_2O_3$). Prefired Material B is used for Final Body II and has a very low iron oxide content. Consequently, a clay or mixture of clays containing a higher iron oxide content, up to about 1%, can be employed. This allows ball clay to be used with advantages for particle packing efficiency and green strength. The final body is fired at 1260–1280° C. for 3 hours.

Final Body III Made without Clay

| Component | Amount | Approximate Median Particle Size |
|---|---|---|
| Prefired Material B | 62% | 15 μm to 20 μm |
| Bone Ash | 20% | 2 μm |
| Nepheline syenite | 4% | 2 μm |
| Reactive alumina (e.g. γ-alumina*) | 4½% | submicron |
| Quartz | 9½% | 2 μm |

This final body is fired at 1260°–1280° C. for 3 hours. $Al(OH)_3$ cannot be used as the alumina component unless heat treated to drive off its constituent water.

Final Body IV

| Component | Amount | Approximate Median Particle Size |
|---|---|---|
| Prefired Material C | 60% | 15 μm |
| *Anorthite | 25 % | 2 μm |
| Nepheline syenite | 5% | 2 μm |
| China clay or halloysite with low-iron content | 10% | micron-submicron |

This final body is fired at 1280° C. for 3 hours.
*Anorthite can be prepared by calcining the molar proportions of calcium carbonate (e.g. chalk), aluminum trihydroxide or other hydrated reactive alumina and silica (e.g. quartz) to make $CaO.Al_2O_3.2SiO_2$. Calcination at temperatures up to 1350° C. and median particle sizes of 2 μm for the components are used to obtain a high degree of anorthite formation. The calcined material is then milled to a median size of approximately 2 μm. The absence of flux in this calcination procedure cuts down the amount of glass arising in the product.

Objects made of Final Bodies I to IV may be biscuit fired at temperatures up to 1280° C. for 3 hours. Some objects may require support to prevent distortion. Glost firing (i.e. to fire on the glaze) may be carried out using temperatures up to 1280° C. Some objects may be once-fired to 1280° C. with the glaze applied. Conventionally, glazes are fired-on at temperatures around 1100° C. The higher temperature at which glazes can be fired-on allows more scratch-resistant glazes, which do not contain lead oxide, to be applied.

EXAMPLE 5

Fine Translucent Whiteware Based on Anorthite

This is a new composition which makes a white, translucent ware because of the use of aluminum trihydroxide or other hydrated or reactive alumina, which has a very low iron oxide content. Anorthite porcelain has no conventional equivalent and contains more than 50% by weight of anorthite, which is expected to be a solid-solution compound incorporating some cations in addition to calcium, aluminum and silicon, such as sodium and potassium. The body may contain small amounts of other crystalline phases, such as mullite or diopside, and the balance is glass. Anorthite has a low thermal expansion coefficient and being the major phase gives anorthite porcelain a lower thermal expansion coefficient than bone china and hence improved thermal shock resistance.

Prefired Material 1

| Component | Amount | Approximate Median Particle Size |
|---|---|---|
| aluminum trihydroxide | 34% | 2 μm |
| Silica (e.g. quartz) | 39% | 2 μm |
| Cacium carbonate (e.g. chalk) | 24½% | 2 μm |
| Magnesium carbonate | 2½% | 2 μm |

The magnesium carbonate could be replaced in whole or part by other compounds containing magnesium, e.g. magnesium hydroxide, provided approximately the same proportions of magnesium and the other cations are achieved in the prefired composition.

Prefired Material 2

| Component | Amount | Approximate Median Particle Size |
|---|---|---|
| aluminum trihydroxide | 40% | 2 μm |
| Silica (e.g. quartz) | 36% | 2 μm |
| Calcium carbonate (e.g. chalk) | 19% | 2 μm |
| Bone ash | 5% | 2 μm |

When a reactive alumina, e.g. γ-alumina, or other hydrated alumina is employed to make Prefired Materials 1 or 2, adjustment to the amounts of all the components used must be made to achieve approximately the same proportion of aluminum in the composition of the prefired material.

In Prefired Material 2, bone ash is employed as a flux. As alternatives, artificial hydroxyapatite, β-tricalcium phosphate, orthophosphoric acid or phosphorus pentoxide may be used to supply the same amount of phosphorus. Adjustment should then be made to the calcium carbonate employed to obtain the same calcium content. Prefired Materials 1 and 2 are fired at 1320°–1340° C. for 3 hours.

Final Bodies A and B

| Component | Amount | Approximate Median Particle Size |
|---|---|---|
| Prefired Material 1 or 2 | 60% | 15 to 20 μm |
| *Prefired Material 1 or 2 | 20% | 2 μm |
| Nepheline syenite | 5% | 2 μm |
| Silica (e.g. quartz) | 5% | 2 μm |
| **Clay | 10% | micron-submicron |

Final Body A employs Prefired Material 1 and Final Body B employs Prefired Material 2.
*Finely ground Prefired Materials 1 and 2 may be replaced with anorthite made without a fluxing component as in Bone China Final Body IV. These final bodies may be densified by firing in the range 1250–1280° C. for 3 hours.
**For the whitest bodies an expensive low-iron content clay would be used or alternatively the clay component could be replaced by a combination of a reactive alumina (e.g. γ-alumina) and finely milled quartz. As the final body contains 80% of prefired material with a very low iron oxide content, less expensive clays may be employed.

Anorthite porcelains may be fired as bone china Final Bodies I to IV.

As anorthite porcelain contains a low glass content (less than 30%) and the crystals of anorthite are small, strengths comparable to those of bone china should result, i.e. 100–140 MPa for the modulus of rupture.

The low coefficient of thermal expansion of anorthite porcelain ($-5\times10^{-6}$/°C.) coupled with the high temperature at which the glaze can be fired-on (up to 1280° C.), should allow a scratch-resistant glaze which does not contain lead oxide to be used. The high strength and good thermal shock resistance coupled with a durable glaze makes this white translucent material very suitable for use as hotelware and highly serviceable domestic tableware of high quality. Its lower coefficient of thermal expansion than bone china and its higher strength than hard porcelain will give it better thermal shock resistance than either of these translucent wares. It is therefore better suited for applications involving fairly rapid changes of temperature, such as in transfer from oven to table and for placing on heaters to maintain the food temperature.

EXAMPLE 6

Bone Chinas Containing Low Bone Ash Contents

Bone chinas having lower contents of bone ash may be made by mixing Prefired Bone China Material A or B of Example 4 with Prefired Material 1 or 2 for anorthite-based whiteware (Example 5) to make the coarse component of the final bone china. The mixture, which can be in any desired proportion, would be used as in Final Bodies I, II and III of Example 4.

EXAMPLE 7

Quartz-Containing Fine Translucent Whiteware

Prefired Material

| Component | Amount | Approximate Median Particle Size |
|---|---|---|
| Quartz | 40% | 5 μm |
| Potash feldspar | 30% | 2 μm |
| Aluminum trihydroxide | 30% | 2 μm |

This material was prefired at 1300° C. for 2 hours.

Final Body

| | | |
|---|---|---|
| Prefired body | 60% | 25 μm |
| Quartz | 16% | 5 μm |
| Potash feldspar | 14% | 2 μm |
| *Clay | 10% | micron-submicron |

This final body was fired at 1210–1230° C. for 2 hours.
*Clay or a mixture of clays having iron oxide up to about 1% can be used. The clay can be replaced with a combination of quartz and γ-alumina (or other reactive alumina) as in Bone China Final Body III.

EXAMPLE 8

Replacement for Hard Porcelain

A whiteware having similar characteristics to hard porcelain, but which can be fired at a lower temperature, of about 1250° C. compared with 1400° C.–1450° C., in an oxidising rather than a reducing atmosphere.

Prefired Material

| Component | Amount | Approximate Median Particle Size |
|---|---|---|
| Aluminum trihydroxide | 30% | 2 μm |
| Quartz | 50% | 2 μm |
| Potash feldspar | 20% | 2 μm |

The prefired material is fired at 1300° C. for 3 hours to dissolve all the quartz.

Final Whiteware

| Component | Amount | Approximate Median Particle Size |
|---|---|---|
| Prefired body | 55% | |
| Quartz | 16% | |
| Potash feldspar | 19% | |
| *Clay | 10% | |

*The clay component can be a single clay or a mixture with an iron oxide content up to about 1%. It can also be replaced by a combination of fine quartz and a reactive alumina, such as γ-alumina as in Bone China Final Body III.

The invention extends to a range of milled prefired materials, prepared from starting materials with low iron contents, usable as a component in making white, translucent fired articles (whitewares) based on anorthite and mullite. The materials can be employed as prefired, particulate (milled) components in the formation of certain translucent whitewares to make them resistant to deformation during firing. The prefired materials are dense in particulate form and, by virtue of their composition, resistant to deformation at the biscuit and glost firing temperatures of the final whitewares, and their incorporation in the whitewares imparts some creep resistance. The use of the prefired materials allows the whitewares to have reduced clay contents, and this reduces deformation arising from anisotropic shrinkage caused by preferential clay platelet alignment. Further advantages can result from the use of the prefired materials, such as high strength, good thermal shock resistance, improved glaze serviceability and whiteness.

The prefired materials can be used to make whitewares using, as one possibility, bone ash. Whitewares formulated with sufficient bone ash to yield a minimum of 35% by weight of tricalcium phosphate after firing can be called bone chinas in the U.K. according to British Standard 5416:1990. Those containing insufficient tricalcium phosphate to meet the British Standard might qualify to be called bone chinas in other countries.

The prefired materials can also be used, as an alternative possibility, to make novel types of whiteware containing no tricalcium phosphate. Such whitewares, when having a high anorthite content, look very similar to bone china, and when (as preferable) also having some mullite content, display improved resistance to pyroplastic deformation.

The design of the prefired material therefore merits some discussion in its own right.

According to this aspect of the present invention, a milled fired material comprises as ingredients from 38–43% (by weight) chemically refined aluminum trihydroxide (or the equivalent in other chemically refined hydrated or reactive alumina), 34–39% silica, 17–22% calcium carbonate (or the equivalent in calcium oxide/hydroxide), up to 5% bone ash or magnesium carbonate (or the equivalent in magnesium oxide/hydroxide) and 0–2% zinc oxide (or the equivalent in zinc hydroxide/carbonate), in which material, when fired, anorthite and mullite are present.

The prefired materials should be made from starting materials which contain low levels of the oxides that cause unwanted colour, viz. titanium and more especially iron. A final whiteware with the required whiteness may then be made using a higher proportion of ball clay in its clay content than would normally be recommended from the 'whiteness' point of view, if the iron oxide content of the prefired material is kept at as low a level as economically possible. Ball clays, it will be recalled, contain significantly higher amounts of iron and titanium oxides than do china clays, but their use confers greater plasticity on the whitewares during forming and higher strength in the unfired state. The iron oxide content of the prefired material should therefore preferably be lower than about 0.1% by weight $Fe_2O_3$ and more preferably lower than 0.05%.

The main starting materials usually comprise: calcium carbonate in the form of either chalk, limestone, crushed marble with 0.1% $Fe_2O_3$ or less or chemically-refined calcium carbonate (alternatively: calcium hydroxide) with about 0.02% $Fe_2O_3$; silica in the form of a fine quartz sand with about 0.02% $Fe_2O_3$; and either aluminum trihydroxide, aluminum monohydroxide or a reactive alumina with 0.01% $Fe_2O_3$ or less. The use of chemically-refined materials as sources for calcia and alumina together with a good quality glass-making quartz sand results in very white prefired materials with low iron oxide contents at an affordable price.

A composition having the main starting materials in the proportions to form only anorthite densities poorly. With excess silica present, high densities and translucency can be obtained. However, such compositions do not result in sufficiently deformation-resistant materials. To achieve this objective, mullite crystals ($3Al_2O_3.2SiO_2$) are developed in the prefired mixture. These crystals are found embedded in the densified prefired mixtures and they are randomly orientated and positioned. The mullite crystals, which are in the form of elongated needles, are postulated to impede relative movement of the anorthite grains at high temperature when the prefired material is stressed.

Minor amounts of other constituents are usually required to effect the densification of the deformation resistant compositions. Two such constituents that have been shown to be effective are bone ash and magnesium carbonate, in prefered quantities of at least 2 or 3%, or at least 1 or 2%, respectively. Magnesium carbonate is a source of akermanite ($2CaO.MgO.2SiO_2$) during calcination. Anorthite forms a eutectic with diopside at 1274° C. and with akermanite at 1234° C. Hence, at a calcination temperature of 1350° C. or higher, liquid-phase sintering can occur. The use of magnesium carbonate (or hydroxide or oxide) has been found to produce the most deformation-resistant prefired materials. As only a small amount of magnesium carbonate is used, a relatively costly chemically-refined material can reasonably be employed. An upper limit on the calcium employed (e.g. equivalent to 21 wt % calcium carbonate) may usefully further encourage mullite formation.

Small additions of ZnO, e.g. at least ½% up to 1%, have proved beneficial in compositions that develop mullite in promoting the elongation of mullite needles which (we postulate) improves deformation resistance; ZnO also slightly whitens discoloured prefired materials.

The components should be milled before firing to under 5 μm median size, preferably under 3 μm, e.g. quartz to 2.4 μm (conventional size 10–11 μm) and alumina to 2–3 μm. Compositions that have been prepared and whose resistance to deformation during firing has been examined are given by way of example in Tables 1 and 2. (Densities are of the bulk prefired material, i.e. before milling).

In order to assess pyroplasticity, rectangular bars 20 mm×120 mm×3.5 mm were formed by pressing granulated powders. To minimise distortion of the test bars during the first firing, the aluminum trihydroxide was lightly calcined prior to being mixed with the other constituents to convert it to a reactive alumina by driving off water. For the first firing, the bars were fully supported whilst being heated at 1350° C. for 3 hours. The bars were then refired at 1280° C. for 3 hours with a central span 85 mm long, unsupported. This was to assess the resistance to pyroplastic deformation at 1280° C. The deformation at the centre of the bar was measured between the top surface of the bar and a straight line connecting its two ends. This was used as a measure of sagging. The bulk density of the prefired mixtures was measured as a rough guide to how the materials densified.

TABLE 1

Bone ash-containing Prefired Materials

| CODE | $CaCO_3$ | $Al(OH)_3$ | $SiO_2$ | BONE ASH | DENSITY (g/cm³) | AMOUNT OF SAGGING (mm) |
|---|---|---|---|---|---|---|
| B-1 | 29.60 | 30.20 | 35.50 | 4.70 | 1.89 | 4.40 |
| B-2 | 22.00 | 34.00 | 39.00 | 5.00 | 2.38 | 2.78 |
| B-3 | 22.00 | 38.97 | 36.03 | 3.00 | 1.94 | 1.91 |
| B-4 | 20.00 | 38.97 | 36.03 | 5.00 | 2.38 | 1.78 |
| B-5 | 19.00 | 39.97 | 36.03 | 5.00 | 2.35 | 1.45 |
| B-6 | 19.00 | 39.97 | 36.53 | 4.50 | 2.42 | 3.00 |
| B-7 | 19.00 | 40.47 | 36.03 | 4.50 | 2.26 | 1.03 |
| B-8 | 18.00 | 40.47 | 36.53 | 5.00 | 2.44 | 2.32 |
| B-9 | 18.50 | 40.47 | 36.03 | 5.00 | 2.42 | 2.04 |
| B-10 | 18.50 | 39.97 | 36.53 | 5.00 | 2.44 | 2.62 |
| B-11 | 18.00 | 41.25 | 36.50 | 4.25 | 2.40 | 1.14 |
| B-12 | 18.50 | 41.00 | 36.50 | 4.00 | 2.30 | 1.71 |
| B-13 | 19.00 | 40.00 | 37.00 | 4.00 | 2.35 | 1.55 |
| B-14 | 19.00 | 41.00 | 36.50 | 3.50 | 2.12 | 1.45 |
| B-15 | 18.00 | 41.00 | 37.00 | 4.00 | 2.45 | 1.64 |

TABLE 2

MgCO$_3$-containing Refired Materials

| CODES | CaCO$_3$ | Al(OH)$_3$ | SiO$_2$ | MgCO$_3$ | ZnO | DENSITY (g/cm$^3$) | AMOUNT OF SAGGING (mm) |
|---|---|---|---|---|---|---|---|
| M-1 | 25.28 | 35.21 | 37.25 | 2.26 | 0 | 2.40 | 6.30 |
| M-2 | 25.00 | 38.90 | 33.60 | 2.50 | 0 | 2.43 | 11.35 |
| M-3 | 24.40 | 38.05 | 32.85 | 4.70 | 0 | 2.46 | 12.75 |
| M-4 | 24.05 | 38.60 | 35.00 | 2.35 | 0 | 2.06 | 4.36 |
| M-5 | 23.50 | 37.75 | 34.20 | 4.55 | 0 | 2.47 | 6.20 |
| M-6 | 20.40 | 39.30 | 37.90 | 2.40 | 0 | 2.42 | 1.19 |
| M-7 | 20.15 | 39.60 | 37.90 | 2.35 | 0 | 2.37 | 0.97 |
| M-8 | 19.95 | 39.85 | 37.85 | 2.35 | 0 | 2.37 | 0.92 |
| M-9 | 19.90 | 41.00 | 36.75 | 2.35 | 0 | 2.24 | 1.11 |
| M-10 | 19.75 | 40.10 | 37.80 | 2.35 | 0 | 2.33 | 1.05 |
| M-11 | 19.70 | 41.35 | 36.65 | 2.30 | 0 | 2.13 | 0.74 |
| M-12 | 19.70 | 40.35 | 37.60 | 2.35 | 0 | 2.36 | 0.80 |
| M-13 | 19.60 | 42.00 | 36.05 | 2.35 | 0 | 2.09 | 1.01 |
| M-14 | 19.55 | 41.00 | 37.15 | 2.30 | 0 | 2.26 | 0.62 |
| M-15 | 19.45 | 41.65 | 36.55 | 2.35 | 0 | 2.05 | 0.67 |
| M-16 | 19.35 | 40.35 | 37.95 | 2.35 | 0 | 2.35 | 0.71 |
| M-17 | 19.35 | 40.60 | 37.70 | 2.35 | 0 | 2.36 | 0.54 |
| M-18 | 19.30 | 41.35 | 37.05 | 2.30 | 0 | 2.15 | 0.45 |
| M-19 | 19.20 | 40.30 | 37.40 | 2.35 | 0.75 | 2.38 | 0.48 |

It can be seen from Tables 1 and 2 that compositions having more than 22 wt % CaCO$_3$ had poor deformation resistance. These developed little or no mullite. The range of compositions for fired materials according to this aspect of the invention are given in Table 3.

TABLE 3

Range of Compositions

| | |
|---|---|
| CaCO$_3$ | 17–22 wt % |
| Al(OH)$_3$ | 38–43% |
| SiO$_2$ | 34–39% |
| either Bone ash | up to 5% |
| or MgCO$_3$ | up to 5% |
| ZnO | up to 1% |

The best composition from the point of view of resistance to deformation and densification at 1280° C. was M19. However, it was not as translucent as M17 which bad the next best combination of low deformation and high density. M17 is believed to be composed of anorthite, mullite, glass and possibly some diopside. It has been used to make whitewares containing tricalcium phosphate and those without bone ash in their formulation.

Other compositions have been used successfully to make whitewares. Those containing less mullite can confer sufficient resistance to deformation for biscuit and glost firing temperatures lower than 1280° C. and they can be more translucent.

During calcination for all the compositions in the specified range given in Table 3, the starting materials should be converted to a mixture that is mainly anorthite plus a significant amount of mullite. The anorthite is likely to be a solid-solution compound incorporating any sodium or potassium impurities in the quartz and other starting materials. In compositions with the lower calcium carbonate contents, more mullite is formed. A balance has to be struck between pyroplastic deformation resistance and translucency. With more mullite, the translucency is reduced but the deformation resistance is improved. When magnesium carbonate is used to effect densification, diopside and possibly akermanite develop. When bone ash is used, more glassy phase is introduced, good for translucency but bad for deformation resistance.

Although the calcined product will contain porosity, particularly resulting from the evolution of water when hydroxides of aluminum are used, it should be composed of sufficiently large dense regions that after milling can yield dense aggregates with a median size of about 20 μm. Fortunately, during milling, cracks move towards the larger pores so that these pores are largely eliminated in the milled product.

A well-reacted, dense calcined product can be produced by a suitable combination of fine particle sizes and intimate mechanical mixing of the constituents coupled with a sufficiently severe heat treatment. With coarser particles and less effective mixing prior to calcination, the heat treatment has to be more severe. That is, higher calcination temperatures and/or longer calcination times will be required. With starting materials of preferably under 3 μm, e.g. about 2 μm media size that are well mixed in a ball mill in water, suitable calcination heat treatments are 1350° C. for 3 hours and can exceed 1400° C., e.g. 1415° C. for 15 minutes. The latter heat treatment is appropriate for calcination in a rotary kiln. During calcination there is little or no tendency for the materials to stick to high-alumina refractories or to alumina crucibles.

Temperatures in excess of those used for the final whitewares are required for the calcination heat treatment to effect the necessary densification. This is a consequence of the compositional design of the prefired materials. As a beneficial result, the prefired materials are resistant to deformation at the biscuit and glost firing temperatures of the final whitewares.

The prefired materials are used as the coarse components of the final whitewares. For this they have median particle size of typically about 20 μm with maximum particle sizes less than 80 μm and preferably less than 50 μm. They can be used additionally as medium-sized components with median particle sizes of about 2 to 3 μm.

With prefired material as a coarse component, fluxes and fillers can be finer than used conventionally without loss of particle packing efficiency and consequent increase in shrinkage. Thus bone ash, feldspar and nepheline syenite when used can have median particle sizes of about 2 to 3 μm or finer, whereas conventionally bone ash would be 3 to 5

μm and the fluxes would be around 10 μm. The use of a flux with a finer particle size leads to a reduction in the residual porosity of the fired whiteware and a consequent improvement in fracture toughness and strength. Finer bone ash yields finer tricalcium phosphate grains which, for a given tricalcium phosphate content, are more effective at scattering light. Consequently, a whiteware containing a lower level of tricalcium phosphate than required by the British Standard can have a similar appearance to bone china if the tricalcium phosphate is of finer size.

The use of coarse, prefired materials allows the clay content of the whiteware to be reduced to 20% and below without loss of particle packing efficiency. The use of a low clay content reduces the unwanted consequences of anisotropic shrinkage resulting from preferential clay particle alignment. In whitewares formed from spray dried granules, clay platelet alignment in the compacted granules undesirably causes enlarged pores to develop during firing. The resulting porosity reduces the fracture toughness and strength of the whiteware. In slip cast wares, the clay platelets tend to become aligned with their large plane faces parallel to the mould surfaces. The anisotropic shrinkage from the alignment undesirably causes distortion of the whiteware during drying and firing. In addition, stresses arising in firing because of anisotropic shrinkage can give rise to the formation of fissures, which can act as fracture-initiating flaws and hence can limit the strength of the ware.

Fired wares cast in multi-part moulds often exhibit seam lines at the positions where separate parts of the mould join. This is caused by differential firing shrinkage resulting from the way the clay is aligned in these regions during casting. The reduction in the clay content should reduce this problem and improve the quality of the cast wares.

Lower clay contents allow whitewares to be made with reduced contents of iron oxide and titania, which improves whiteness. Alternatively with a lower total clay content, a higher proportion of the clay may be ball clay before the iron content (introduced via the ball clay) rises to absolute levels which discolour the whitewares.

Whitewares made with such low clay content can be formed by powder pressing, slip casting, pressure casting and are ideally suited to injection moulding. With powder pressing and the casting techniques all the shapes required for tableware can be produced. In modern practice, powder pressing is becoming, where suitable, the preferred technique as it can be automated and the pressed ware does not need a separate drying operation.

Examples of Whitewares Made with Prefired Material M

W1: Whitewares Made with 35% Bone Ash

| Component | Amount | Approx. Median Particle Size |
| --- | --- | --- |
| M17 | 50% | 20 μm |
| Bone ash | 35% | 2 μm |
| Nepheline syenite | 5% | 2 μm |
| Clay | 10% | micron-submicron |

W2: Whiteware Made with 40% Bone Ash

| Component | Amount | Approx. Median Particle Size |
| --- | --- | --- |
| M17 | 50% | 20 μm |
| Bone ash | 40% | 2 μm |

-continued

| Component | Amount | Approx. Median Particle Size |
| --- | --- | --- |
| Clay | 10% | micron-submicron |

More bone ash can be introduced by reducing the content of the prefired material.

W3: Whiteware Made without Bone Ash

| Component | Amount | Approx. Median Particle Size |
| --- | --- | --- |
| M17 | 60% | 20 μm |
| M17 | 25% | 2 μm |
| Clay | 15% | micron-submicron |

The clay used to make these examples was a china clay with low iron-oxide content. However, whitewares have also been prepared with half the china clay replaced with ball clay to improve the formability and green (unfired) strength.

The pyroplasticities of W1, W2 and W3 were compared with that of conventionally-made bone china by determining the sagging of test bars having the previously given dimensions. The bone ash-containing whitewares W1 and W2 were first fired at 1280° C. for 3 hours either fully supported or with an 85 mm central span unsupported. The bars which had been fully supported were then given a second firing, this time at 1280° C. for 3 hours with the central span unsupported. The first firing tested the behaviour of these materials at the temperature required to densify them. The second firing represents a glost firing. The conventional bone china was given a first and second firing in the same way but at 1230° C. for 3 hours. The results are given in Table 4.

TABLE 4

Sagging Data on Bone Ash-containing Whitewares

| Whiteware | Sagging in mm | |
| --- | --- | --- |
| | First Firing | Second Firing |
| W1 | 7.5 | 2.2 |
| W2 | 8.9 | 2.4 |
| Conventional Bone China | 10.0 | 6.6 |

From the table it can be seen that conventional bone china sags more during the first firing and considerably more during the second firing. When conventional bone china was given a second firing (like W1 and W2) at 1280° C. for 3 hours it sagged by 30.4 mm. These results show that the reformulated bone ash-containing whitewares would be able to be glazed at substantially higher temperatures than the conventional material. This will allow a higher-melting selection of more serviceable glazes to be designed and applied. In addition, for those whitewares containing less tricalcium phosphate than the conventional bone china the thermal expansion coefficient is lower. For example, W1 has a thermal expansion coefficient of $6.5 \times 10^{-6}/°C$. compared with $-8.5 \times 10^{-6}/°C$. for conventional bone china. This should impart improved thermal shock resistance.

Whitewares made with no bone ash can have a very low tendency to sag. Test bars of W3 sag by only 1.5 mm on being fired for the second time at 1280° C. for 3 hours.

W3 has a low thermal expansion coefficient of $5 \times 10^{-6}/°C$. This material should have very good thermal shock resistance and be suitable for a glaze that is very serviceable. It could be glazed at even higher temperatures than 1280° C. as it sags by only 2.1 mm when fired at 1340° C. for 3 hours.

We claim:

1. A whiteware ceramic composition comprising
   filler,
   4 to 10% by weight of a flux having a median particle size of below 6 microns,
   a prefired, milled, ceramic material, and
   raw clay constituting from 5 to 20% by weight of the composition.

2. A composition according to claim 1, wherein the median particle size of the flux is below 2 microns.

3. A composition according to claim 1, wherein the prefired material is equiaxed.

4. A composition according to claim 1 where in the composition contains a constituent whose median particle size exceeds 20 microns, a constituent whose median particle size is from 1–20 microns and a constituent whose median particle size is less than 1 micron.

5. A composition according to claim 1, where in the composition contains a constituent whose median particle size is less than 1 micron, a constituent whose median particle size is from 1–12 microns and a constituent whose median particle size exceeds 12 microns.

6. A composition according to claim 5 whose size distribution of particles is such that the composition shrinks by 10% or less when fired.

7. A composition according to claim 1, wherein the prefired material is milled to a median particle size of from 10 to 50 microns.

8. A composition according to claim 7, wherein said median particle size is from 10 to 30 microns.

9. A composition according to claim 1, wherein the prefired material is milled to a median particle size of from 1 to 20 microns.

10. A composition according to claim 7, further comprising the same or a different prefired material milled to a median particle size of one-fifth to one-tenth that of the other prefired milled material.

11. A composition according to claim 1, wherein prefired particles exceeding 80 microns are absent.

12. A composition according to claim 1, wherein the prefired material is present in an amount of 30 to 90%.

13. A composition according to claim 12, wherein the prefired material is present in an amount of 60 to 90%.

14. A composition according to claim 12, wherein the prefired material is present in an amount of 30% to 50%.

15. A composition according to claim 12, wherein one size cut of the prefired material is present in an mount of 30 to 65%, said size cut being defined as those particles none of which exceeds five times the size of any other particle.

16. A composition according to claim 15, wherein said one size cut of prefired material is present in the amount of 55–65%.

17. A composition according to claim 1, wherein the filler comprises a material selected from the group consisting of quartz, cristobalite, α-alumina, wollastonite and bone ash.

18. A composition according to claim 1, wherein the filler has a median particle size of from 1 to 8 microns.

19. A composition according to claim 1, wherein the filler comprises bone ash of median particle size not exceeding 2 microns.

20. A composition according to claim 1, wherein the raw clay content is 5–15%.

21. A composition according to claim 20, wherein the raw clay content is 5–12%.

22. A composition according to claim 1, wherein the prefired material is translucent.

23. A composition according to claim 1, wherein the prefired milled material has a porosity which does not exceed 7%.

24. A composition according to claim 23, wherein the porosity of the prefired material does not exceed 5%.

25. A milled fired material comprising as ingredients from 38 to 43% by weight chemically refined aluminum trihydroxide, 34–39% silica, 17–22% calcium carbonate, up to 5% bone ash or magnesium carbonate and 0–2% zinc oxide, wherein anorthite and mullite are present when the material is fired.

26. A material according to claim 25, containing less than 0.1% by weight iron oxide.

27. A material according to claim 25, comprising at least 2% bone ash or at least 1% magnesium carbonate.

28. A material according to claim 25, comprising at least ½% by weight zinc oxide.

29. A material according to claim 25, wherein the silica is from 36 to 39%.

30. A material according to claim 25, wherein the calcium carbonate is from 18 to 21%.

31. A material according to claim 25, wherein all of the ingredients have a median particle size not exceeding five microns.

32. A material according to claim 25, fired at a temperature of at least 1350° C.

33. A material according to claim 32, fired at above 1400° C.

34. A fired whiteware made by firing a composition according to claim 1.

35. A fired whiteware according to claim 34 coated with lead-free glaze.

36. A whiteware according to claim 34, which was glazed and fired at the same time.

37. A material according to claim 27, wherein the bone ash is present in an amount of at least 3%.

38. A material according to claim 27, wherein said magnesium carbonate is present in an amount of at least 2%.

* * * * *